United States Patent
Prasad

(10) Patent No.: US 11,494,358 B2
(45) Date of Patent: Nov. 8, 2022

(54) SYSTEMS AND METHODS FOR PROVIDING AN ADAPTIVE ATTENTION-BASED BLOOM FILTER FOR TREE-BASED INFORMATION REPOSITORIES

(71) Applicant: Verizon Patent and Licensing Inc., Arlington, VA (US)

(72) Inventor: Abhinav Prasad, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 491 days.

(21) Appl. No.: 16/582,718

(22) Filed: Sep. 25, 2019

(65) Prior Publication Data
US 2021/0089507 A1 Mar. 25, 2021

(51) Int. Cl.
*G06F 16/22* (2019.01)
(52) U.S. Cl.
CPC ...... *G06F 16/2255* (2019.01); *G06F 16/2282* (2019.01)
(58) Field of Classification Search
CPC .................. G06F 16/2255; G06F 16/2282
See application file for complete search history.

(56) References Cited

U.S. PATENT DOCUMENTS

| | | | | |
|---|---|---|---|---|
| 8,290,972 B1 * | 10/2012 | Deshmukh | ........ | G06F 16/24556 707/758 |
| 10,642,994 B1 * | 5/2020 | Allen | ................. | H04L 63/0428 |
| 10,970,393 B1 * | 4/2021 | Stiles | .................... | G06F 21/554 |
| 2014/0280201 A1 * | 9/2014 | Vuong | .............. | G06F 16/24522 707/747 |
| 2015/0193526 A1 * | 7/2015 | Gaur | .................... | G06F 16/316 707/747 |
| 2017/0154099 A1 * | 6/2017 | Chen | .................... | G06F 16/325 |
| 2021/0243580 A1 * | 8/2021 | Wang | .................... | H04L 67/34 |

* cited by examiner

*Primary Examiner* — Robert W Beausoliel, Jr.
*Assistant Examiner* — Mohammad S Bhuyan

(57) ABSTRACT

A system described herein may use a Bloom filter to reduce unnecessary accesses to memory. The filter may provide constant search time through hashing and use a relatively small amount of space. The filter may utilize hashing functions to generate a key associated with each data item of a set of data items, where the bit length of the key may be calibrated and tuned for selection of a minimum key length (in number of bits) versus a desired false positive rate. Such keys may be combined to form the filter. The resulting filter may be compared to various request keys that are generated using the same hashing functions in order to determine whether a requested item is present in the associated memory. The keys may be compared to the filter by comparing each bit in the key to each bit of the filter at the same location.

20 Claims, 10 Drawing Sheets

SYSTEMS AND METHODS FOR PROVIDING AN ADAPTIVE ATTENTION-BASED BLOOM FILTER FOR TREE-BASED INFORMATION REPOSITORIES

BACKGROUND

Users may access various data sources across low-latency systems that allow large bandwidth aggregation. With the advent of Next generation system, such as Fifth Generation ("5G") wireless networks, accessing such data sources may consume various resources such as time, bandwidth, and power.

DETAILED DESCRIPTION OF THE PREFERRED EMBODIMENTS

The following detailed description refers to the accompanying drawings. The same reference numbers in different drawings may identify the same or similar elements.

5G networks provide faster connections, higher throughput, and more capacity than previous solutions. As such, the networks require efficient data access algorithms that limit unnecessary operations such as memory reads performed during searches for data items that are not present in memory. Thus, reduction of search time and reduction of unnecessary memory accesses greatly increases overall system speed and capacity.

Embodiments described herein provide a system that reduces search time and unnecessary accesses to memory when determining whether a given item is present in a memory. For instance, as described herein, some embodiments may use a Bloom filter to determine whether an item is potentially present in memory (or is definitively not present in the memory). A Bloom filter is a space-efficient probabilistic data structure that is used to test set membership, and may be used in some embodiments to determine whether a memory access should be performed. In a Bloom filter-based approach, false positives are possible (i.e., an item may be indicated as present in memory even when not present), but false negatives are not (i.e., an item that is indicated as not present is definitely not present in memory) when using such a structure. The filter may provide constant search time through hashing and use a relatively small amount of space. The filter may utilize hashing functions to generate a key associated with each data item of a set of data items, where the bit length of the key may be calibrated and tuned for selection of a minimum key length (in number of bits) versus a desired false positive rate. Such keys may be combined to form the filter, where each key and the filter have the same bit length. The resulting filter may be compared to various request keys that are generated using the same hashing functions in order to determine whether a requested item is present (or is potentially present) in the associated memory. The keys may be compared to the filter by comparing each bit in the key to each bit of the filter at the same location.

Figure 1A:
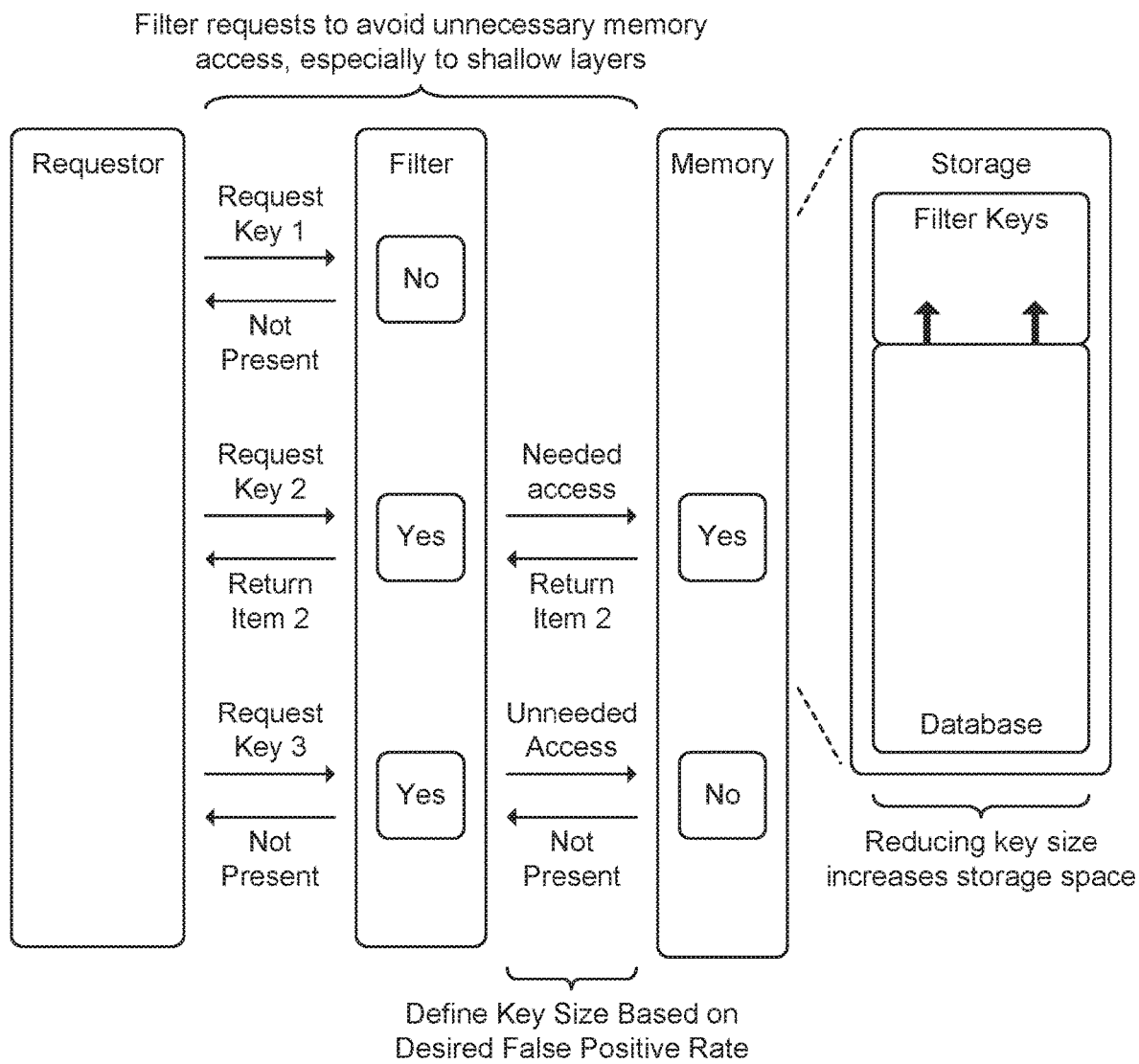
FIGS. 1A and 1B illustrate an example embodiment described herein, in which an adaptive Bloom filter limits unnecessary memory accesses with reduced false positive rate and reduced key size.

For example, as shown in FIG. 1A, a database (and/or other data repository) may store a set of data items. The data items may each be associated with a key, which may be generated in accordance with embodiments described herein. Throughout this description, a "seed" may refer to any bit string that refers to a data item stored in a database, repository, memory, etc. The seed may be based on content attributes (e.g., name, metadata, type, etc.), address or other identifying information (e.g., memory address information, register address information, file number, etc.), and/or other appropriate bit strings associated with items stored in memory. A given data item may, in some embodiments, be associated with multiple seeds. For example, assuming that a particular data item is (or refers to) a media file that includes content, one seed associated with the particular data item may be based on a filename of the media file, another seed may be based on a name of a musical artist associated with the content, another seed may indicate a length of the media content, etc.

A "query seed," as discussed herein, may be generated based on a query of the database, repository, memory, etc., where the specific type of database query (e.g., memory address, metadata match, etc.) and associated query seed may depend on attributes of the seeds associated with the data items. In some embodiments, a single query may be associated with multiple seeds. For instance, pattern matching and/or machine learning may be used to identify portions of a query associated with different attributes and generate different seeds for each attribute (e.g., a query that includes an artist name and a song name may be used to generate two separate seed queries—one based on the artist name and the other based on the song name).

Throughout this description, a "key" may refer to any hashed bit string that is generated based on a seed. A "request key" may refer to a bit string associated with a hashed query seed. Reduction in key bit length increases request handling bandwidth, while reduction of false positive rate reduces unnecessary disk access. In addition, any reduction in key size results in increased storage space for data.

As shown in FIG. 1A, a requestor may request a data item by submitting a request query, which may be used to generate a first request key. For example, in some embodiments, the first request key may be generated by hashing the request query. For instance, a user may search for media content, associated with a particular artist, by submitting a request query that includes the artist's full name. In accordance with some embodiments, a bit string representation of the artist's full name (or a portion thereof) may be hashed to generate the first request key. As discussed above, multiple seeds may be generated for each request query (e.g., a query including artist name and song name). Each seed (or a portion thereof) may be hashed to generate multiple request keys for the query.

In this example, the filter may indicate that the first request key is not present (i.e., that no data items match the request query). When the filter returns a "not present" result, no disk access or memory read needs to be performed. In this example, a "not present" result may indicate that no stored media items are associated with the requested artist. If multiple seeds and/or request keys are generated from the request query, each request key may be applied to the filter and a separate result provided (e.g., continuing the media example, a query may match the artist name but not the song name).

As shown, the requestor may further request a data item using second request key. As similarly described above, the second request key may be generated based on a second request query. In this example, the filter indicates that the item is (or may be) present, based on the filter including a filter key that matches the second request key. In some embodiments, for example, the filter may be applied by comparing each logical high bit of the second request key to the same bit location of the filter. The number of logical high bits may be the same as the number of hash functions (i.e., each hash function may set the bit in one bit location to logical high). If all the corresponding bit locations of the filter are also logical high, the requested key may be present. If any corresponding bit locations of the filter are not also logical high, the requested key is not present.

Accordingly, based on the filter yielding a potentially positive result, a memory access is made to retrieve the item from memory. In some embodiments, the memory access may utilize a full memory address or location specifier. Each request key may be associated with the full memory address (or other location identifier) such that if the filter indicates an item may be present in memory, a memory access may be made. In this example, the item is present in memory and is therefore retrieved and returned to the requestor. Throughout this disclosure, examples may use logical high bits to indicate hash results in the keys and filters (i.e., bit locations generated by the hash functions may be set to logical high). Different embodiments may use different specific representations of hash results (e.g., logical low bits).

In some cases, multiple matching keys may be identified, and multiple items may be returned. The memory access and retrieval may be performed in various appropriate ways, depending on the type of database, memory attributes, and/or other relevant factors. Continuing the media example, the user may request a different artist or search for a specific song title. The query may be hashed and the resulting request key compared to the filter. The result may be provided to the user as a list of matching items (e.g., a list of content items by the artist or songs matching a portion of the specified title), by returning a single matching item, and/or other appropriate ways.

In the third key request example, the filter indicates the item is present (e.g., the filter includes one or more keys that match the third request key), but a disk read indicates that the item is not present. In this situation, it may be considered that the filter has produced a "false positive" result. The false positive result may be transparent to the requestor (e.g., the response may appear the same as the response to the first requested key). Increasing the key size results in reduced false positive rate, as the increased number of unique keys provided by the increased key size results in less bit overlap as more items are added to the filter.

Figure 1B:
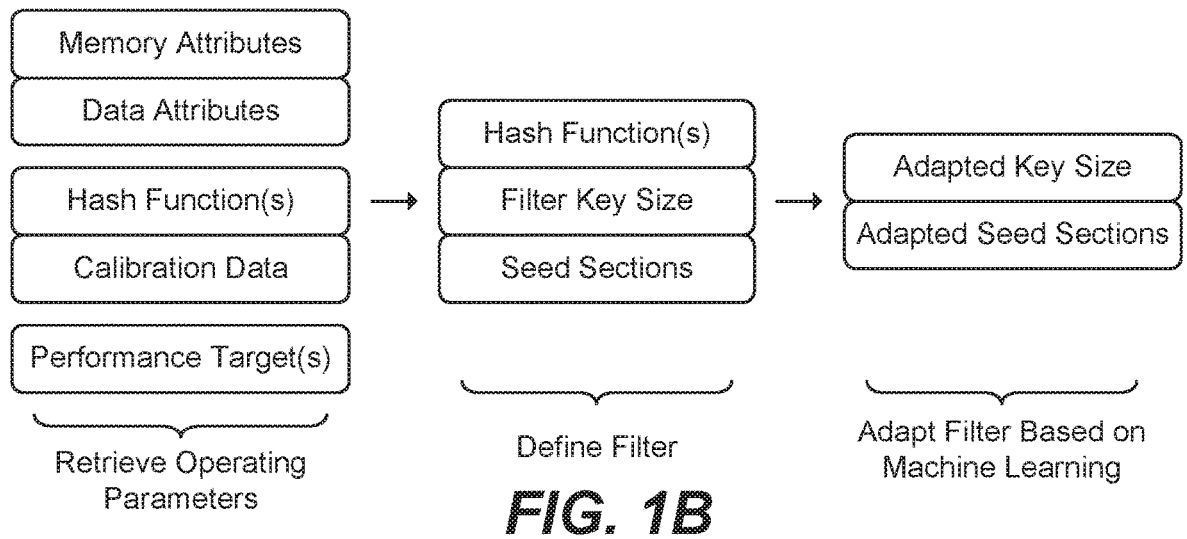

In accordance with some embodiments, the filter (and associated keys) may be defined and/or tuned as shown in FIG. 1B. For example, various memory attributes (including parameters associated with the physical storage device, database attributes such as type or structure, etc.), attributes related to the data stored in the database, hash function definition(s), calibration data associated with the hash function(s), and the desired filter performance data (e.g., false positive rate target) may be retrieved, selected, specified, and/or otherwise indicated. The memory attributes may include attributes such as size (e.g., number of bytes, pages, or other appropriate units), memory address size, memory level, expected workload (e.g., percentage of operations that are read operations, percentage of operations that are write operations, etc.), and/or other memory attributes (e.g., memory type, access times, etc.). Memory may be arranged in a hierarchy of memory levels (e.g., L1 or L2 cache, Random Access Memory ("RAM"), disk storage, etc.), where each level is typically smaller and faster than the next level. To avoid waiting for higher levels, a lower level may respond by filling a buffer and then activating a transfer from a higher level.

Data attributes may include, for example, file size, file types, file names, metadata, etc. The hash function(s) may be defined as mathematical formulas or equations, and the calibration data may be based on measured or simulated results using the associated hash functions and may be represented as a set of curves, a lookup table, or other appropriate ways. Performance targets may include, for instance, desired false positive rate, maximum key size, key storage space (e.g., a total or maximum amount of storage space to allocate to the filter keys), etc.

As shown, the filter may be defined based on the performance targets, memory attributes, data attributes, and calibration data, etc. The filter definition may include a key size, seed sectioning information, hash function(s), and/or other appropriate attributes. Some embodiments may identify relevant calibration data based on memory attributes (e.g., level, expected workload, etc.). The calibration data may include multiple sets of curves or associated data elements that indicate one or more performance attributes versus key size (e.g., false positive rate versus bit length of each key). Each curve or set of associated data points may be associated with various implementation attributes, such as memory level, data type, workload distribution, etc. Such curves or data points may include various fit coefficients that may be used to fit calibration data to other specific implementation attributes than those associated with the calibration data (e.g., a single curve at a specified workload may be adjusted for application to other workloads). Some embodiments may determine a key bit length by comparing the matching or fitted calibration data to the performance targets (e.g., by selecting a key size associated with a particular false positive rate that is below the desired false positive rate).

In some embodiments (e.g., as described below with respect to FIG. 6), the seeds may be divided into sections and each section may be passed through a hash function. Multiple iterations of the same hash function may be used in parallel in some embodiments. The number of seed sections may be equal to the number of hash functions. The seed sections may be defined by analyzing the seeds and/or attributes of the stored data that may be used to generate the seeds or included in the seeds. Such analysis may result in seed sections of differing size and/or bit location(s) that may result in improved key definition and reduced false positive rate.

Machine learning and/or other suitable techniques may be used to define and/or adjust the definition of the filter in some embodiments. For example, the filter may be adapted by varying the key size and/or seed sections depending on changing conditions or attributes (e.g., memory level) and/or updated calibration or workload data. For instance, some embodiments may collect information related to false positive rate, workload (e.g., percentage of reads vs writes), seed information, data item information, etc. and use machine learning, artificial intelligence, and/or other suitable techniques to update calibration data and/or key section information. Such updated data may be used to update the filter parameters, as appropriate (e.g., by changing key size). In some embodiments, historical information associated with devices and/or data with similar attributes may be analyzed to determine or adjust the key size and/or seed sections. In addition, such usage information may be used to generate and/or update calibration data in some embodiments. For example, a previously defined filter may have been generated for a memory of a same size or type as a particular memory; the filter key size and/or seed sections for the particular memory may be determined based on the previously defined filter (e.g., may be the same as, and/or otherwise based on, the filter key size and/or seed sections for the previously defined filter). Such updated or newly generated calibration data may be distributed to other systems or devices, as appropriate.

Figure 2:
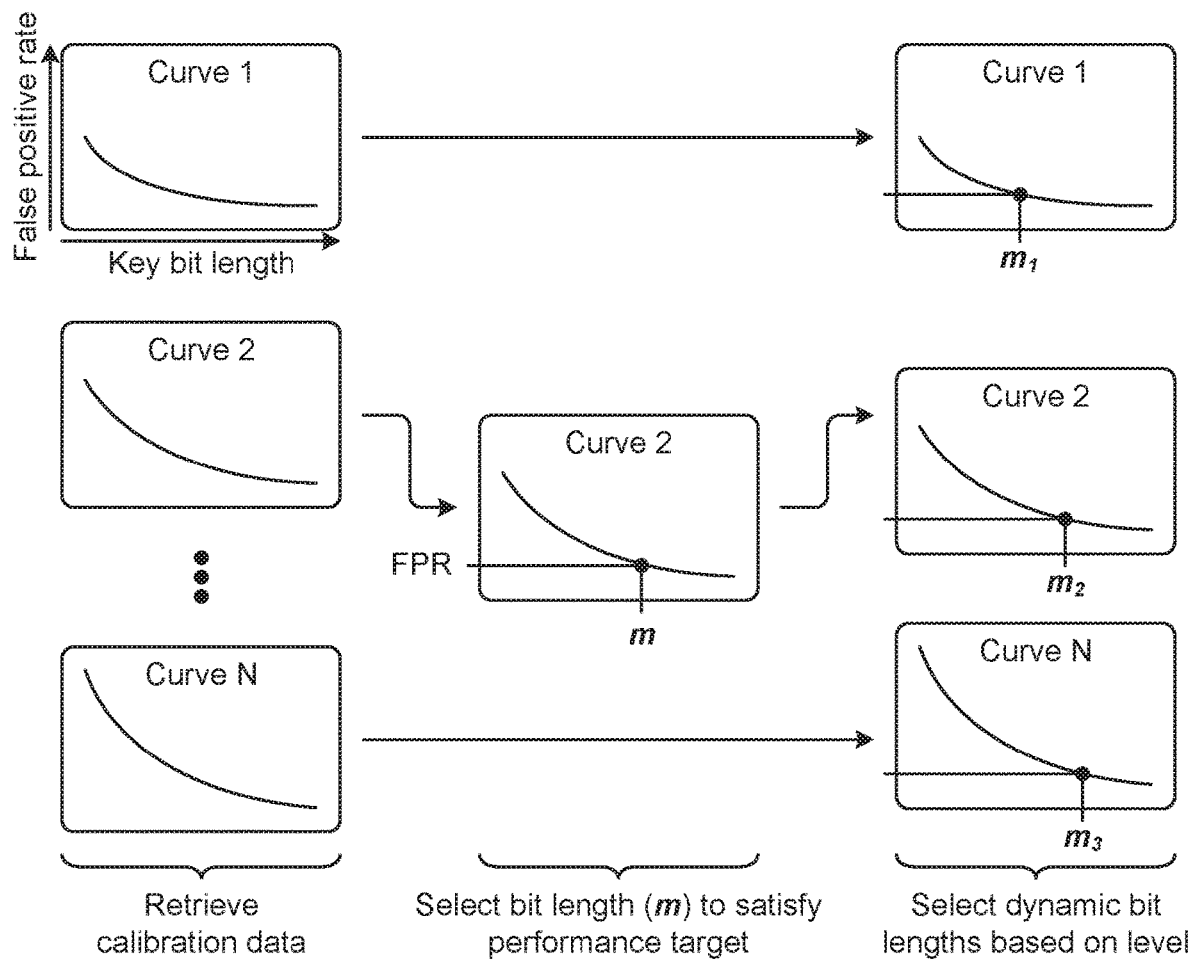
FIG. 2 illustrates use of calibration data to select bit length of keys in accordance with one or more embodiments described herein.

As shown in FIG. 2, calibration curves may be used to select key bit length to satisfy specified performance targets (e.g., to meet a desired false positive rate ("FPR") limit). The curves may be based on collected data using the hash functions of some embodiments. Each curve may be associated with various operating attributes (e.g., memory level). The curves may be specified in various appropriate ways (e.g., lookup tables, mathematical expressions, etc.). In addition to selecting a base key length, some embodiments may dynamically adjust bit lengths based on attributes such as memory level. In this example, a desired false positive rate is associated with three different key lengths, depending on memory level. The calibration data may be generated based on test results (e.g., by measuring performance under different workloads), simulation data, and/or historical data. The calibration data, including curves or data points and fit coefficients, may be automatically updated based on collected usage information.

Figure 3:
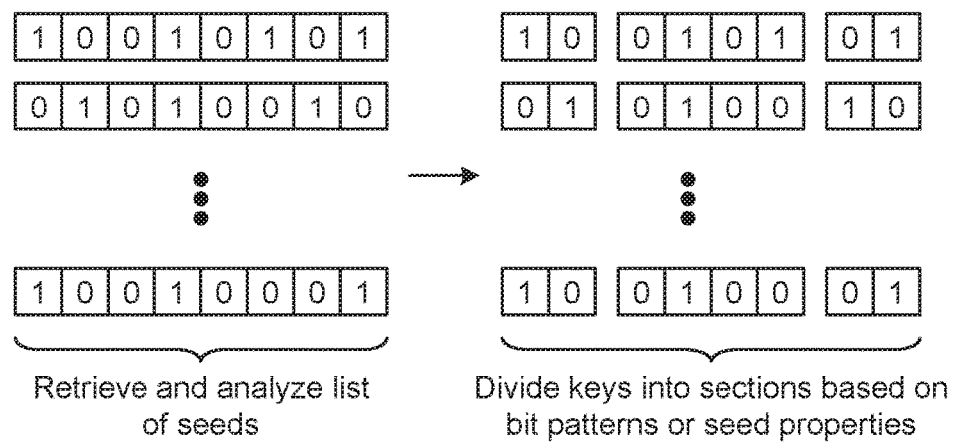
FIG. 3 illustrates division of keys into sections for uniform coverage of key bits during hashing in accordance with one or more embodiments described herein.

As shown in FIG. 3, seeds are divided into sections, where each section will be passed to the hash function of some embodiments. In one example implementation, a thirty-two bit seed (e.g., a thirty-two bit memory address) may be divided into eight groups of four bits, and each group of four bits may be passed to one of eight identical hash functions. The seed sections may be of varying length and/or arrangement, depending on the analysis of seed data. Although these seed sections are shown as adjacent groups, the sections may include sets of non-adjacent bit locations.

Sections may be defined based on machine learning and/or knowledge of seed attributes. For instance, some embodiments may focus on bit patterns known to represent a particular attribute. For example, a given bit pattern may be identified as representing a particular musical artist's name in metadata of a file. In the example of FIG. 3, a section with a repeating pattern across multiple seeds (e.g., "010" is repeated across all the first three bits of the middle section in all seeds) includes more bits (as each bit provides less information) than sections with more randomized data (e.g., the other bits fluctuate from "0" to "1" and back or from "1" to "0" and back). Of course, repeating patterns may also be identified and separated into seed sections, depending on the seed or data attributes and/or other relevant factors.

The seeds may be defined based on various attributes of the items stored in memory. Each seed value may be generated using various attributes of the stored item (or request). For instance, a user may request media content associated with a particular artist by entering the artist's name as a search string request. A bit string may be generated based on the request. Such a bit string may be generated in various appropriate ways (e.g., by generating an ASCII representation of the search string).

Similarly, a seed may be generated for each stored item (e.g., by generating a bit string based on various attributes of the stored item). For example, the database may include many media content items. Each item may be associated with metadata such as an author, title, etc. Each seed may be generated based on bit strings associated with the metadata.

Figure 4A:
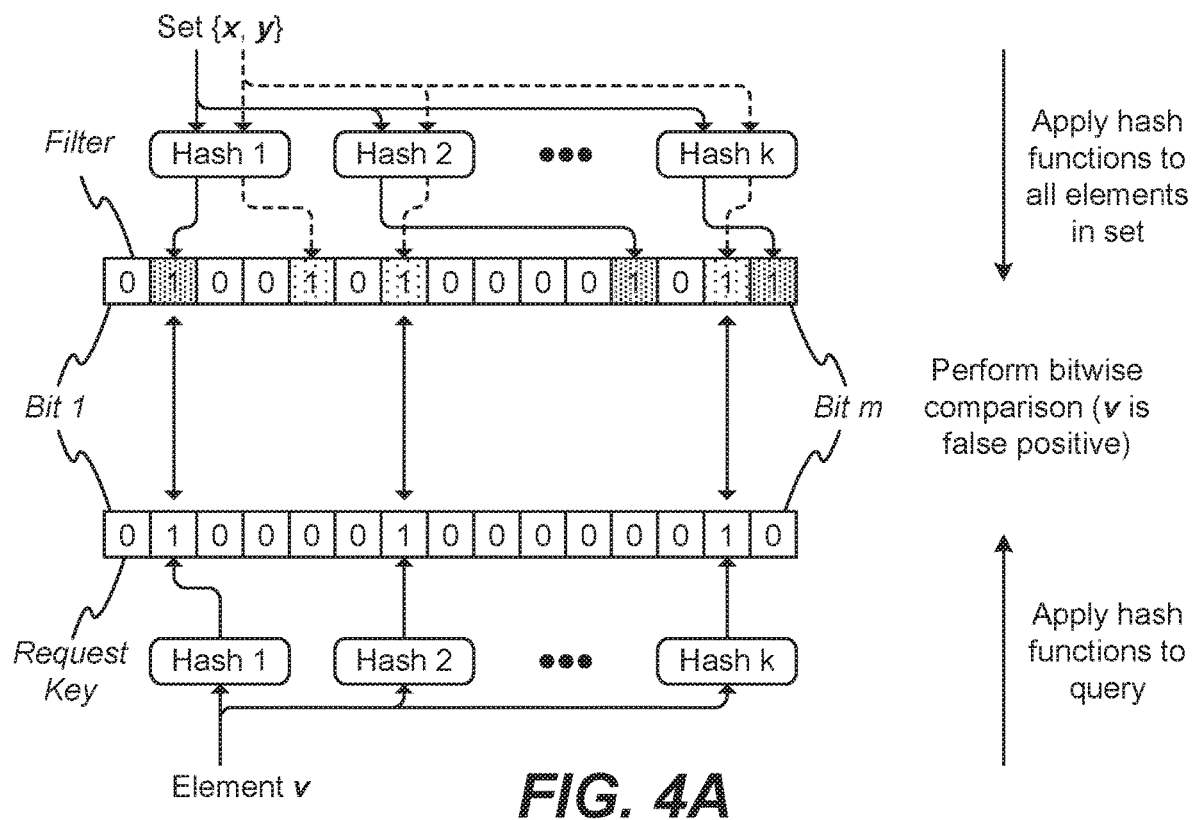
FIG. 4A illustrates Bloom filter generation and application in accordance with one or more embodiments described herein.
Figure 4B:
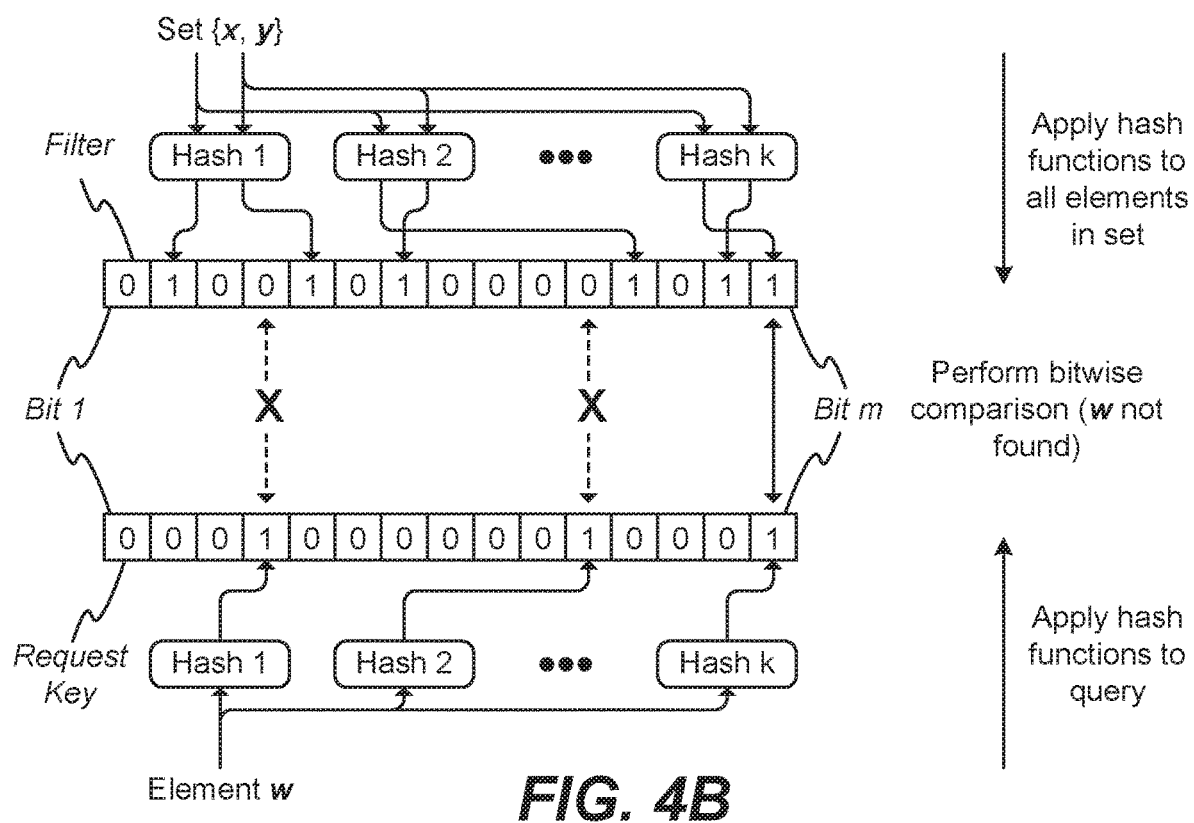
FIG. 4B illustrates Bloom filter generation and application in accordance with one or more embodiments described herein.

FIG. 4A and FIG. 4B illustrate Bloom filter generation and application in accordance with one or more embodiments described herein. Elements x and y may represent media content items (e.g., audiovisual content such as music videos), where the associated seeds may be generated based on information such as song name, artist name, etc.

The seeds associated with the elements may be divided into sections (e.g., in a manner similar to that described above) and passed to the various hash functions (where there are k hash functions in this example). In this example, the hash of the seed for element x (i.e., the key for element x) results in bit locations indicated by a first fill pattern (i.e., locations two, twelve, and fifteen) while the hash of the seed for element y (i.e., the key for element y) results in bits locations indicated by a second fill pattern (i.e., locations five, seven, and fourteen). It is a tautology that each filter bit can be set high only once, such that additional overlapping keys may not set the full number of possible bit locations (i.e., the number of bit locations changed from low to high in the filter may be less than k as the number of hashed seeds increases). Furthermore, the bit locations associated with each key may partly or exactly match bit locations associated with one or more other keys (i.e., hashing may result in two different bit string seeds producing the same key, especially for small values of k) such that the resulting keys may not be unique.

As shown, the keys associated with set elements x and y may be combined equivalent to using a logical OR (i.e., any logical high bit location in any key is also logical high in the filter) in order to form the filter that is used for comparison to request keys (i.e., any bit that is set high in any key is also set high in the filter).

Continuing the media example above, each artist name may be hashed, and the resulting keys may be combined to form a filter. Some embodiments may generate multiple filters depending on the type of content, query type, etc. For instance, a media library may include separate filters related to song name, artist name, release year, etc. Such filters may also be combined into a single filter associated with multiple query types. For instance, a user may be able to search for any of a song name, artist name, etc. where a single filter may be used to evaluate the queries.

The filter may be generated during a database merge as each block of sorted data items becomes available. A key may be generated for each item in the list (i.e., each item in the set of elements to be included in the filter) and the filter updated to include each additional key as generated. Such filter generation may be automatically performed for multiple levels of a database or storage.

A single hash function may be iterated multiple times for use on multiple key sections in order to vary attention paid to different bit positions. Each seed section may be passed through the hash function to generate each filter key. In this example, each hash function sets one bit location of the filter. In some embodiments, each hash function may set multiple bit locations.

In the example of FIG. 4A, a requestor may then initiate a query for element v. Continuing the media storage example, the query may include an artist name, song name, etc. that may be received as a text string. A seed may be generated based on the query, which may likewise be sectioned and passed through the same hash functions. The resulting request key may then be compared to the filter. In this example, element v is indicated as being included in the set, due to matching the logical high bits from the filter that is based on the set elements x and y. The false positive in this example results from the bit locations of the key associated with element v partially overlapping with the bit locations of the key associated with element x and the key associated with element y, where a true positive result would result when all matching bit locations are associated with a single set element key.

In the example of FIG. 4B, a requestor may then initiate a query for element w, which may be a query for a different artist, song, etc. A seed may be generated based on the query, which may likewise be sectioned and passed through the same hash functions. The resulting request key may then be compared to the filter. In this example, element w is correctly indicated as not included in the set, as some of the bits of the request key do not match corresponding bits of the filter key (as indicated by the dashed lines with an "X").

The filter may be configured for optimal performance based on memory level and depth. For instance, more bits may be assigned to keys associated with lower memory levels (which may be accessed more frequently), thus resulting in a lower false positive rate, while fewer bits may be assigned to keys on levels that are not accessed as frequently, where a higher false positive rate may be acceptable.

The seed sections may be modified (e.g., the number of bits included in each section may be changed, the bit locations associated with each section may be updated, etc.) based on machine learning applied to the seed sectioning. Such machine learning may also be applied to the seed generation itself (e.g., the selection and/or manipulation of bit strings associated with data items or queries may be updated). Such machine learning may include analysis of existing seeds and keys to identify bits or strings of bits that have limited variability (and thus supply less information) such that the variability of each key section is matched as closely as possible. As another example, the machine learning may be applied to search queries such that seed sections associated with highly searched elements may be increased in size relative to seed sections associated with less highly searched elements. For instance, and continuing the media library example, if more users search by artist name than by song name, more bits may be allocated to the seed section(s) associated with artist name than are allocated to seed section(s) associated with song name.

Similarly, such learning may be applied to the generation of the seed before the seed is divided into sections. For instance, if the seed is generated based on attributes such as artist name, song name, etc., the attribute data may be processed or filtered such that the full seed allocates more bits related to artist name than song name.

Figure 5:
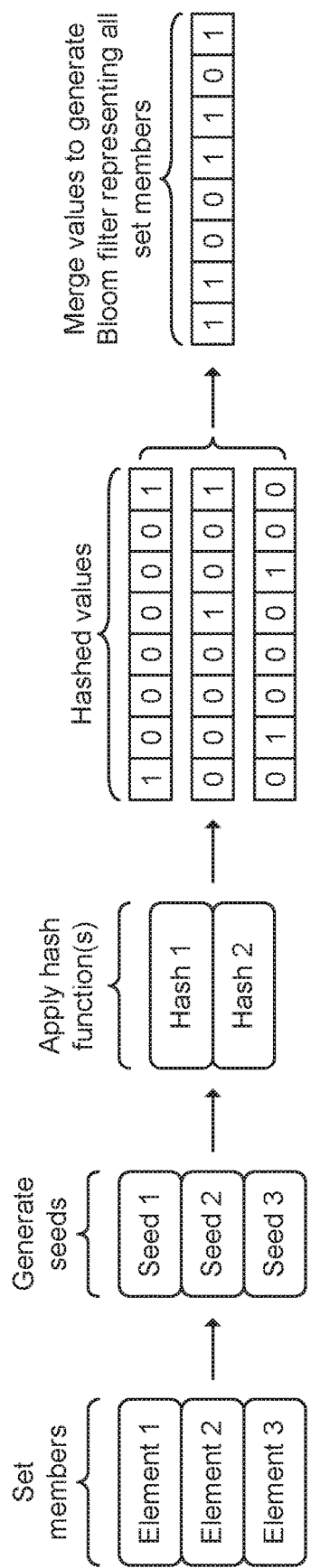
FIG. 5 illustrates Bloom filter generation in accordance with one or more embodiments described herein.

FIG. 5 illustrates Bloom filter generation in accordance with one or more embodiments described herein. As shown, a seed representing each element in the set (e.g., each stored data item) may be generated, divided into sections, and hashed, resulting in a hashed key for each element. The hashed keys may be merged to form the filter representing the elements in the set. In this example, there are two hash functions, each setting one bit of the key or filter. As explained in more detail below in reference to FIG. 8, the number of hash functions may be selected based on some specified performance criteria (e.g., desired false positive rate).

Figure 6:
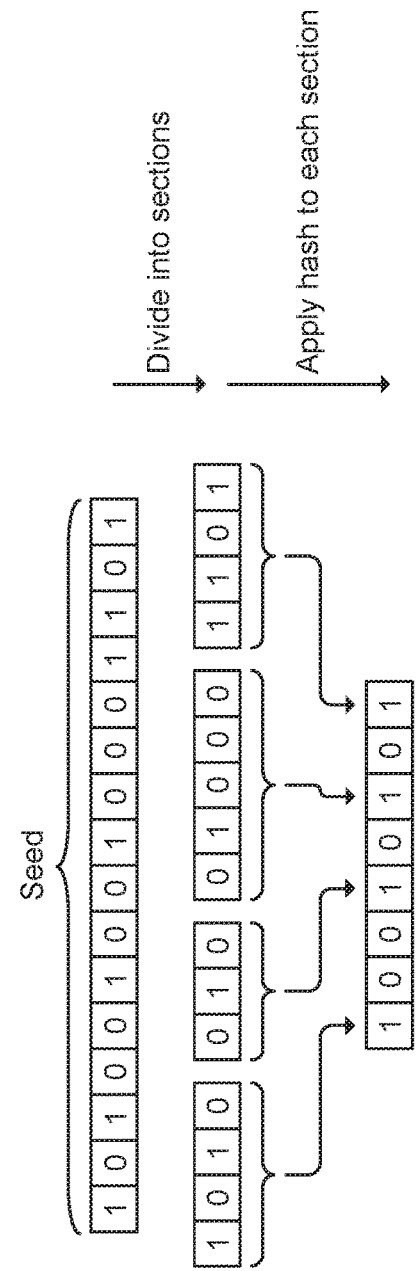
FIG. 6 illustrates seed sectioning and hashing in accordance with one or more embodiments described herein.

FIG. 6 illustrates seed sectioning and hashing in accordance with one or more embodiments described herein. As shown, the seed may be divided into sections. The sections are varying length in this example, but may be of equal length. Each section may be hashed, and used to set one or more bits of the key. Some embodiments may use the same hash function for each seed section while other embodiments may use different hash functions for different seed sections. In this example, each hash sets one bit of the key or filter.

Figure 7:
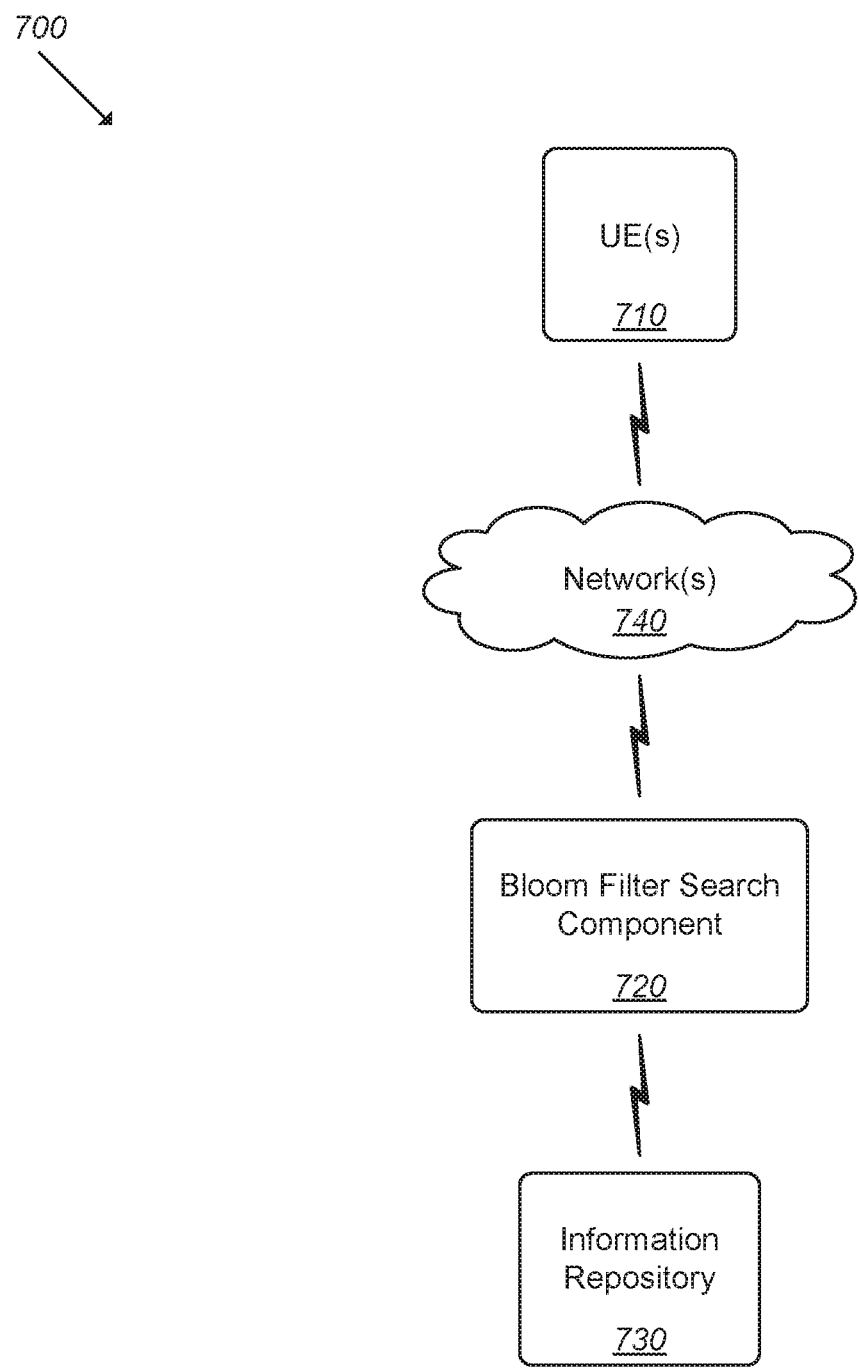
FIG. 7 illustrates an example environment in which one or more embodiments, described herein, may be implemented.

FIG. 7 illustrates an example environment 700 in which one or more embodiments, described herein, may be implemented. As shown, environment 700 may include one or more UEs 710, Bloom filter search component ("BFSC") 720, information repository 730, and network 740. The quantity of devices and/or networks, illustrated in FIG. 7, is provided for explanatory purposes only. In practice, environment 700 may include additional devices and/or networks; fewer devices and/or networks; different devices and/or networks; or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more functions described as being performed by another one or more of the devices of environments 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 710 may include any computation and communication device that is capable of communicating with one or more networks (e.g., network 740). For example, UE 710 may include a device that receives content, such as web pages (e.g., that include text content and/or image content), streaming audio and/or video content, and/or other content, via an Internet connection and/or via some other delivery technique. UE 710 may also receive user interactions (e.g., voice input, touches on a touchscreen, "clicks" via an input device such as a mouse, etc.). In some implementations, UE 710 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

BFSC 720 may include one or more devices (e.g., a server device or a distributed set of devices, such as a cloud computing system) that perform one or more actions described herein. In some embodiments, portions of the functionality described below with respect to BFSC 720 may be implemented at UE 710 or other system device that access or provide access to data. BFSC 720 may manage data requests from the UE 710, generate filters based on the contents of information repository 730, generate keys based on the data requests, compare the keys to the filter, and otherwise manage access to the information repository 730. BFSC 720 may implement machine learning and/or other suitable techniques to improve filter performance (e.g., reduce false positive results) and/or reduce key length.

In some embodiments, the BFSC 720 may be deployed as part of a mobile access edge computing ("MEC") platform located in close proximity to a base station (or "gNodeB") that is integrated with an information repository powered by attention-based Bloom filters. The database may be hardware accelerated and may be log structured in memory, hard disk, non-volatile memory express ("NVME"), solid state drives ("SSD"), and/or other non-transitory computer-readable media.

Information repository 730 may include one or more storage devices that perform one or more actions described herein. Such storage devices may include non-volatile storage to which data may be written and/or from which data may be read. For example, information repository 730 may store information regarding filters, item keys, etc. Information repository 730 may store various types and/or numbers of data items.

Network 740 may include one or more radio access networks ("RANs"), via which UEs 710 may access one or more other networks or devices, a core network of a wireless telecommunications network, an IP-based packet data network ("PDN"), a wide area network ("WAN") such as the Internet, a private enterprise network, and/or one or more other networks. In some implementations, network 740 may be, include, or be in communication with a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 710 may connect to, and/or otherwise communicate with, via network 740, data servers, application servers, other UEs 710, etc. Network 740 may be connected to, and/or otherwise in communication with, one or more other networks, such as a public switched telephone network ("PSTN"), a public land mobile network ("PLMN"), and/or another network.

Figure 8:
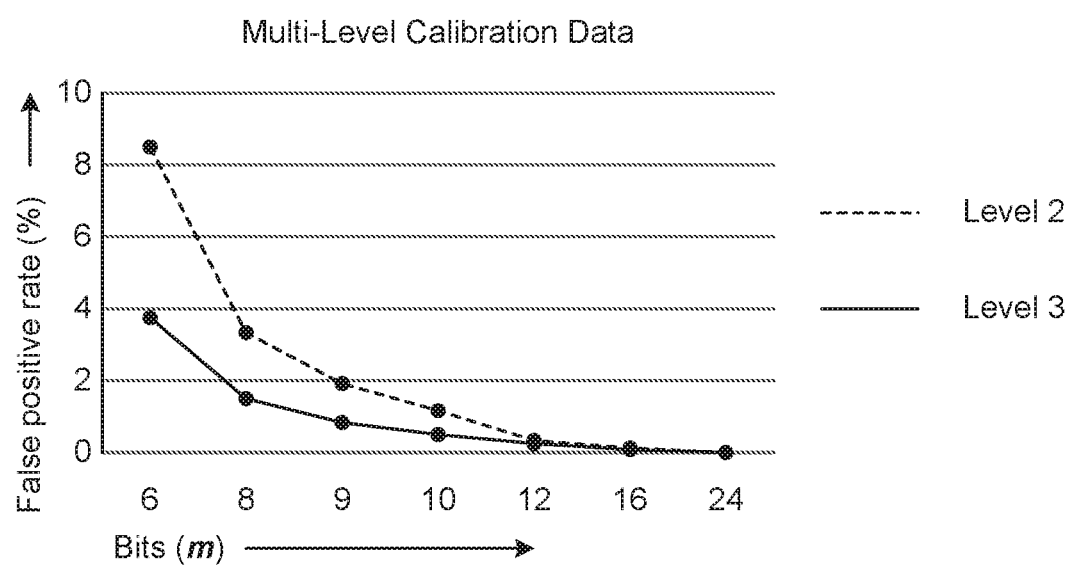
FIG. 8 illustrates example calibration curves that demonstrate the selection of key bit length in accordance with performing techniques described herein.

FIG. 8 illustrates example calibration curves that demonstrate the selection of key bit length in accordance with performing techniques described herein. The data is presented for exemplary purposes only, and different embodiments may include different calibration curves, different numbers of curves associated with various different memory attributes, different types of calibration data (e.g., look up tables), etc. The calibration data may be based on measurements made under appropriate workloads. For instance, the curves shown in FIG. 8 may correspond to a workload with ninety percent writes and ten percent reads. Different embodiments may be tuned to stay within a specified false percentage rate (e.g., 0.3%) over a range of workloads and levels.

The converging point to zero is near twelve bits, which outperforms existing solutions by two to ninety-nine times as the number of bits per key increases.

A generic Bloom filter results in a probability of a false positive, f, specified by Formula 1.

$$f=(1-p)^k \qquad \text{(Formula 1)}$$

Where p is calculated using Formula 2.

$$p=(1<1/m)^{kn}\approx e^{-kn/m} \qquad \text{(Formula 2)}$$

Where m is key length, k is the number of hashing functions and n is the number of elements in the set. Minimizing false positive rate with respect to k results in Formula 3.

$$f=(0.6185)^{m/n} \qquad \text{(Formula 3)}$$

Some embodiments may implement a Bloom filter design that uses Fibonacci or Golden ratio hashing with an irrational ratio of approximately 0.6180339887 (e.g., resulting from the expression ($\sqrt{5}-1$)/2). As shown in FIG. 8, the number of bits, m, to be included in the key may be selected by comparing the appropriate curve to the desired false positive rate threshold. For example, a false positive limit of less than two percent may be achieved using an eight bit key for level 3 and a nine bit key for level 2.

In some embodiments, BFSC 720 may dynamically select a number of bits per key for different levels of memory. In order to avoid costly disk reads for initial (or lower) levels where most activity occurs, a higher number of bits may be allocated. As depth increases, BFSC 720 may allocate fewer bits per key. Such an approach may result in close to zero percent false positive rate, especially for lower level layers. BFSC 720 may utilize a fixed table that approximates the measured performance curves and/or dynamically fit each curve using linear or nonlinear regressions. Such dynamic fitting may include support-vector machines (SVMs) or recurrent neural network (RNN) based algorithms such as long short-term memory (LSTM) or gated recurrent units (GRU).

Figure 9:
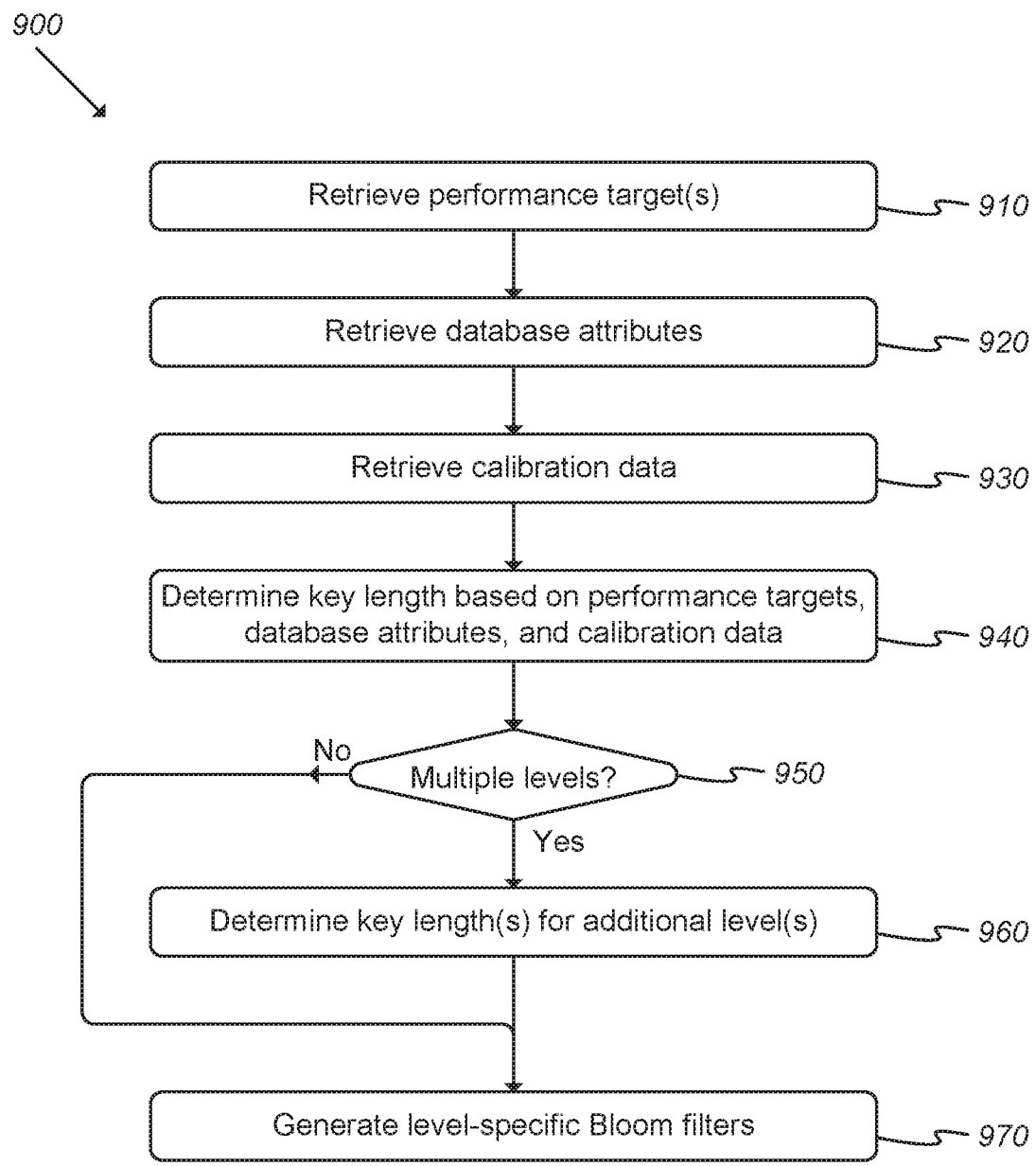
FIG. 9 illustrates an example process by which key lengths may be selected to satisfy specified performance criteria.

FIG. 9 illustrates an example process 900 by which key lengths may be selected to satisfy specified performance criteria. As described herein, the keys (and associated filter) may be used to test set membership. Process 900 may be performance as an initial setup process, when a new level of memory is created or accessed, when a database is merged, and/or at other appropriate times. In some embodiments, process 900 may be performed by BFSC 720. In some embodiments, process 900 may be performed by one or more other devices in addition to, or in lieu of, BFSC 720.

As shown, process 900 may include retrieving (at 910) performance targets. Such performance targets may include, for instance, a desired false positive rate limit. The performance targets may be retrieved from various appropriate sources. For instance, a memory or database may have associated configuration information that defines performance targets. As another example, performance targets may be specified by an administrator or other user.

Process 900 may also include retrieving (at 920) database attributes. Such attributes may include, for instance, database size, structure, type, stored element type, etc.

The process may also include retrieving (at 930) calibration data. Such data may include, for instance, a set of calibration curves, lookup tables, fit coefficients, regression equations, etc. The calibration data may be retrieved based on the performance targets and/or database attributes. For instance, a number of memory sizes may each have an associated set of calibration data. As another example, different types of databases may be associated with different sets of calibration data.

The process may include determining (at 940) a key length based on the performance targets, database attributes, and calibration data. As described above, calibration curves (or other appropriate data representations) may be generated based on measured data, regressive fit, and/or other appropriate factors. One or more such curves may be generated or selected and used to determine the bit length by comparing the desired performance targets to the calibration value for the specified bit length. The minimum key length that satisfies the performance targets may be selected.

Process 900 may include determining (at 950) whether there are multiple memory levels associated with the database. If the process determines there are multiple levels, the process may determine (at 960) key lengths for each additional level. The key length(s) may be determined in a similar manner to that described above in reference to the key length determination made at 940.

The process may include generating (at 970) a Bloom filter for each level of memory. The Bloom filters may be generated using a process such as process 1100 described below.

Figure 10:
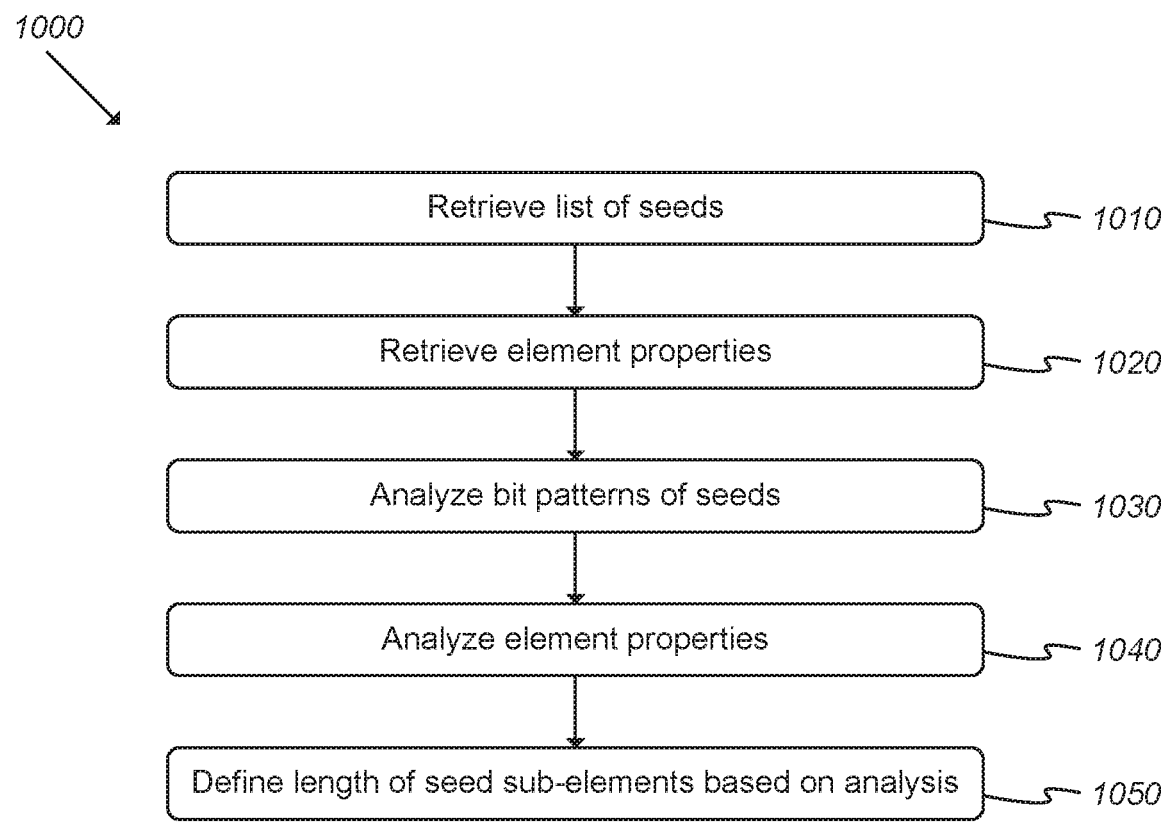
FIG. 10 illustrates an example process by which seed attributes may be analyzed to define seed sections.

FIG. 10 illustrates an example process 1000 by which seed attributes may be analyzed to define seed sections. As described herein, the seeds may be used to generate the keys and also the Bloom filters. Process 1000 may be performance when a database is merged and/or at other appropriate times. In some embodiments, process 1000 may be performed by BFSC 720. In some embodiments, process 1000 may be performed by one or more other devices in addition to, or in lieu of, BFSC 720.

As shown, the process may include retrieving (at 1010) a list of seeds. Such a list may be provided as part of a memory merge process, where each block of sorted items may be added to the seed list as each block becomes available. As described above, the seeds may be generated based on various attributes of the database elements. Any bit string associated with each database element may be used as a portion of the seed.

Process 1000 may include retrieving (at 1020) element properties, if available. Such properties may include, for instance, type of data, element size, physical location in memory, attributes of the stored data item, etc.

The process may analyze (at 1030) bit patterns of the seeds to identify sections. Such sections may be of varying length and/or position. Bits may be grouped into section based on various relevant factors (e.g., randomness of bits or groups of bits, attributes associated with bit patterns or locations, etc.).

Process 1000 may include analyzing (at 1040) element properties. Such analysis may include analysis of element attributes, bit locations associated with definition of those attributes, and/or other relevant attributes. Query histories may be similarly analyzed to identify patterns or attributes of request keys that may be relevant to section definition.

The process may define (at 1050) a length of each seed sub-element based on the analysis. As discussed above, instead of a length or size of each sub-element, some embodiments may define sub-elements as groups of bits that may or may not be adjacent.

Figure 11:
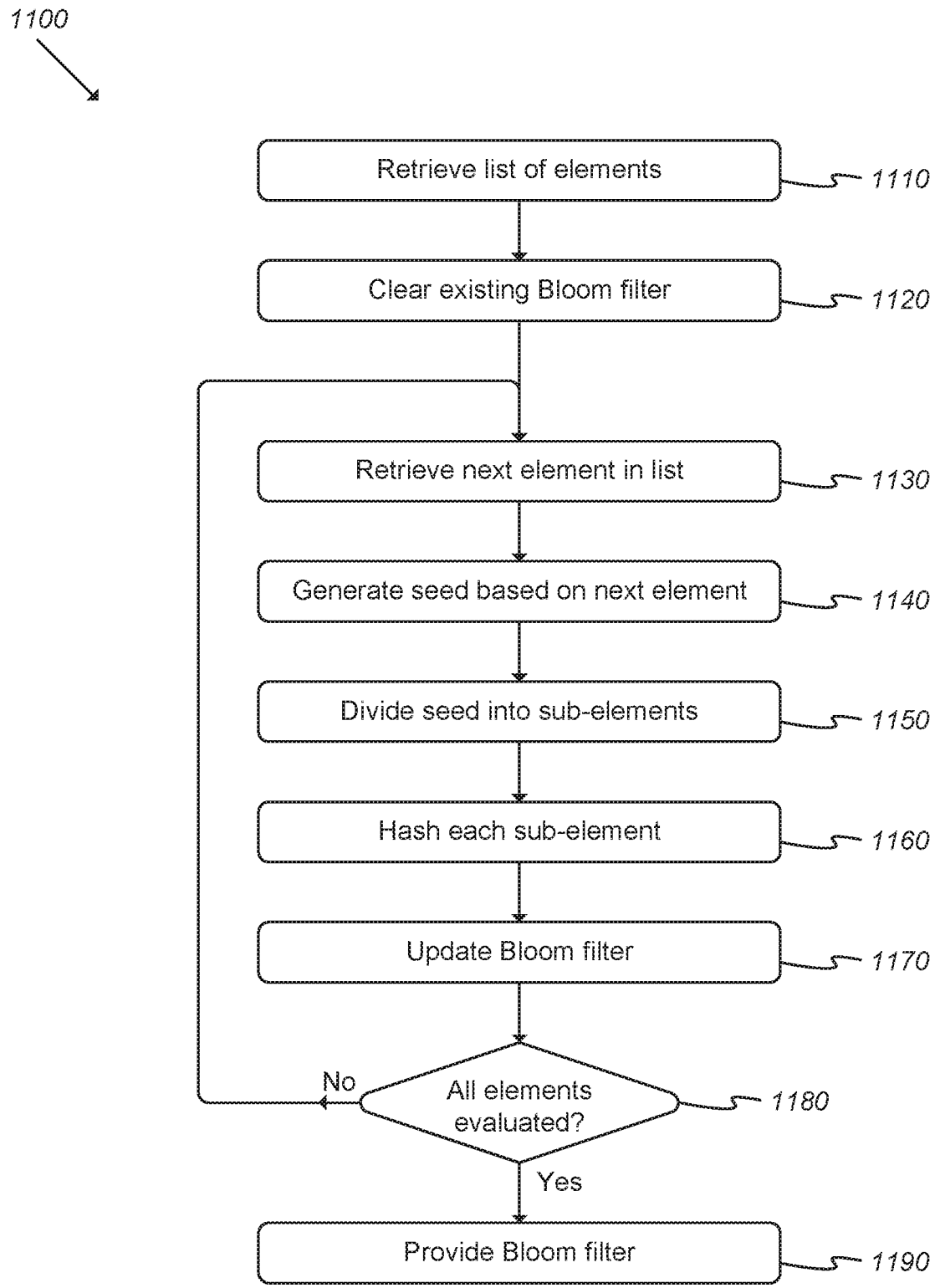
FIG. 11 illustrates an example process by which a Bloom filter may be generated.

FIG. 11 illustrates an example process 1100 by which a Bloom filter may be generated. As described herein, the Bloom filter may be used to test group membership (i.e., presence in memory). Process 1100 may be performance during a database merge and/or at other appropriate times. In some embodiments, process 1100 may be performed by BFSC 720. In some embodiments, process 1100 may be performed by one or more other devices in addition to, or in lieu of, BFSC 720.

As shown, process 1100 may include retrieving (at 1110) a list of elements. Such a list may be generated during a database merge operation and may be provided to process 1100 as the elements are sorted. The process may clear (at 1120) any existing filter by setting all bits to zero.

Process 1100 may iteratively retrieve (at 1130) the next element in the list and generate (at 1140) a seed based on the next element. Such a seed may be generated in various appropriate ways, as described above and may be based on various appropriate attributes of the next element.

The process may divide (at 1150) the seed into sub-elements. Such sub-elements may be of uniform or varying length. The number of sub-elements may match a number of hash functions (or iterations of the same hash function) to be used.

Process 1100 may hash (at 1160) each sub-element in order to generate a key. The elements may be hashed using a formula such as Formula 3 described above. Each hashed sub-element may set one bit of the resulting key to logical one, where the output of the hash function specifies the bit position to be set. The key may be stored for future use or reference.

The process may update (at 1170) the Bloom filter by setting any additional bits through a logical OR operation with any of the bits set in the hash generated at 1160.

Process 1100 may determine (at 1180) whether all elements in the list have been evaluated. Process 1100 may repeat 1130-1180 as necessary to process all elements in the list. If the process determines (at 1180) that all elements have been evaluated, the process may provide (at 1190) the Bloom filter for use. The Bloom filter may also be stored to the database for future use.

Figure 12:
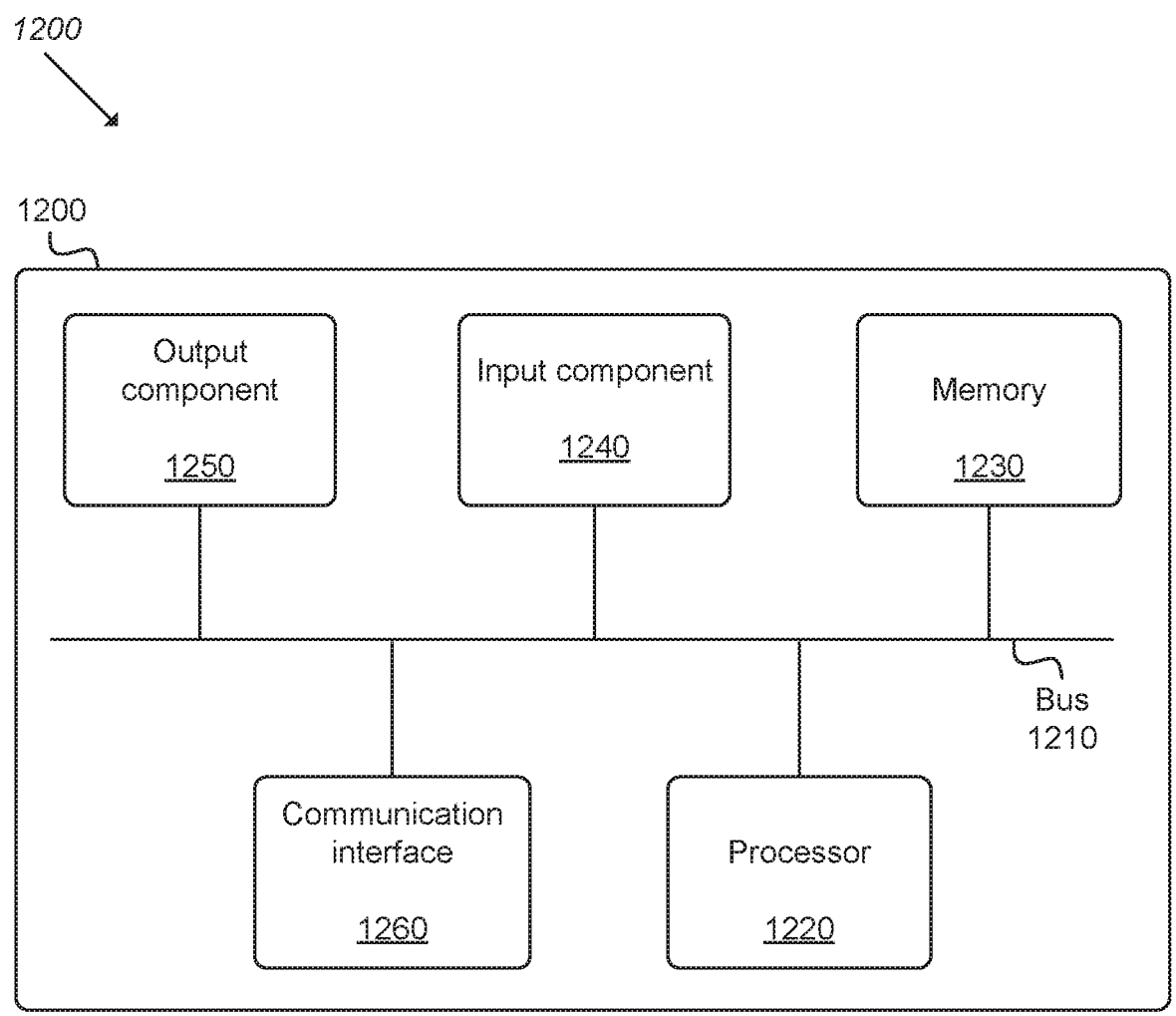
FIG. 12 illustrates example components of one or more devices, according to one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while series of blocks have been described with regard to FIGS. 4-7, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
receive a set of performance targets associated with a database that includes information regarding a plurality of items;
receive a set of database attributes associated with the database;

receive calibration data associated with the database,
wherein the calibration data comprises a respective false positive rate for each of a plurality of key lengths,
wherein the calibration data is based on historical information associated with using each of the plurality of key lengths and determining respective false positive rates based on the use of each of the plurality of key lengths;
determine a filter key length based on the set of performance targets and the set of database attributes by:
comparing the set of performance targets and the set of database attributes to the calibration data, and
selecting, based on the comparing, a key length that satisfies the set of performance targets;
generate at least one filter having the determined filter key length;
receive a search query;
generate a request key based on the search query, the request key having a same length as the determined filter key length;
compare the request key to the at least one filter;
when the request key matches the at least one filter, access the database to determine whether the database includes an item that is associated with the search query; and
when the request key does not match the at least one filter, determine, without accessing the database that the database does not include an item that is associated with the search query.

2. The device of claim 1, wherein executing the processor-executable instructions, to generate at least one filter having the determined filter key length, further causes the one or more processors to:
receive a list of the plurality of items;
generate a seed for each item in the list of the plurality of items;
divide the seed into a plurality of sections; and
hash each section from the plurality of sections to set bits of the at least one filter.

3. The device of claim 2, wherein executing the set of processor-executable instructions further causes the one or more processors to:
receive a set of item properties related to the list of the plurality of items;
analyze the set of item properties;
analyze bit patterns of the seeds generated for each item in the list of the plurality of items; and
define a size of each section from the plurality of sections based on the analysis of the bit patterns and the set of item properties.

4. The device of claim 2, wherein each of the plurality of sections is hashed using a first hash function.

5. The device of claim 1, wherein:
the calibration data comprises data associated with a first memory level and a second memory level,
the determined filter key length is determined based on the calibration data associated with the first memory level, and
executing the set of processor-executable instructions further causes the one or more processors to determine a second filter key length based on the calibration data associated with the second memory level.

6. The device of claim 5, wherein the second determined filter key length is less than the determined filter key length.

7. The device of claim 1, wherein the database is implemented at a Mobile Access Edge Computing ("MEC") component of a wireless network.

8. A non-transitory computer-readable medium, storing a set of processor-executable instructions, which, when executed by one or more processors, cause the one or more processors to:
receive a set of performance targets associated with a database that includes information regarding a plurality of items;
receive a set of database attributes associated with the database;
receive calibration data associated with the database,
wherein the calibration data comprises a respective false positive rate for each of a plurality of key lengths,
wherein the calibration data is based on historical information associated with using each of the plurality of key lengths and determining respective false positive rates based on the use of each of the plurality of key lengths;
determine a filter key length based on the set of performance targets and the set of database attributes by:
comparing the set of performance targets and the set of database attributes to the calibration data, and
selecting, based on the comparing, a key length that satisfies the set of performance targets;
generate at least one filter having the determined filter key length;
receive a search query;
generate a request key based on the search query, the request key having a same length as the determined filter key length;
compare the request key to the at least one filter;
when the request key matches the at least one filter, access the database to determine whether the database includes an item that is associated with the search query; and
when the request key does not match the at least one filter, determine, without accessing the database that the database does not include an item that is associated with the search query.

9. The non-transitory computer-readable medium of claim 8, wherein the set of processor-executable instructions, to generate at least one filter having the determined filter key length, include processor-executable instructions to
receive a list of the plurality of items;
generate a seed for each item in the list of the plurality of items;
divide the seed into a plurality of sections; and
hash each section from the plurality of sections to set bits of the at least one filter.

10. The non-transitory computer-readable medium of claim 9, wherein executing the set of processor-executable instructions further causes the one or more processors to:
receive a set of item properties related to the list of the plurality of items;
analyze the set of item properties;
analyze bit patterns of the seeds generated for each item in the list of the plurality of items; and
define a size of each section from the plurality of sections based on the analysis of the bit patterns and the set of item properties.

11. The non-transitory computer-readable medium of claim 9, wherein each of the plurality of sections is hashed using a first hash function.

12. The non-transitory computer-readable medium of claim 8, wherein:
the calibration data comprises data associated with a first memory level and a second memory level,
the determined filter key length is determined based on the calibration data associated with the first memory level, and
executing the set of processor-executable instructions further causes the one or more processors to determine a second filter key length based on the calibration data associated with the second memory level.

13. The non-transitory computer-readable medium of claim 12, wherein the second determined filter key length is less than the determined filter key length.

14. The non-transitory computer-readable medium of claim 8, wherein the database is implemented at a Mobile Edge Computing ("MEC") component of a wireless network.

15. A method, comprising:
receiving a set of performance targets associated with a database that includes information regarding a plurality of items;
receiving a set of database attributes associated with a database that includes information regarding a plurality of items;
receiving calibration data associated with the database, wherein the calibration data comprises a respective false positive rate for each of a plurality of key lengths, wherein the calibration data is based on historical information associated with using each of the plurality of key lengths and determining respective false positive rates based on the use of each of the plurality of key lengths;
determining a filter key length based on the set of performance targets and the set of database attributes by:
comparing the set of performance targets and the set of database attributes to the calibration data, and
selecting, based on the comparing, a key length that satisfies the set of performance targets;
generating at least one filter having the determined filter key length;
receiving a search query;
generating a request key based on the search query, the request key having a same length as the determined filter key length;
comparing the request key to the at least one filter;
when the request key matches the at least one filter, accessing the database to determine whether the database includes an item that is associated with the search query; and
when the request key does not match the at least one filter, determining, without accessing the database that the database does not include an item that is associated with the search query.

16. The method of claim 15, wherein generating at least one filter having the determined filter key length includes:
receiving a list of the plurality of items;
generating a seed for each item in the list of the plurality of items;
dividing the seed into a plurality of sections; and
hashing each section from the plurality of sections to set bits of the at least one filter.

17. The method of claim 16 further comprising:
receiving a set of item properties related to the list of the plurality of items;
analyzing the set of item properties;
analyzing bit patterns of the seeds generated for each item in the list of the plurality of items; and
defining a size of each section from the plurality of sections based on the analysis of the bit patterns and the set of item properties.

18. The method of claim 16, wherein each of the plurality of sections is hashed using a first hash function.

19. The method of claim 15, wherein:
the calibration data comprises data associated with a first memory level and a second memory level,
the determined filter key length is determined based on the calibration data associated with the first memory level, and
the method further comprises determining a second filter key length based on the calibration data associated with the second memory level, wherein the second determined filter key length is less than the determined filter key length.

20. The method of claim 15, wherein the database is implemented at a Mobile Edge Computing ("MEC") component of a wireless network.

* * * * *